United States Patent
Cho et al.

(10) Patent No.: US 7,751,019 B2
(45) Date of Patent: Jul. 6, 2010

(54) DISPLAY PANEL AND METHOD OF MANUFACTURING THE SAME COMPRISING A COLUMN SPACER HAVING A BOTTOM SIDE HAVING A SHAPE OF A CONCAVE-SIDED POLYGON

(75) Inventors: Young-Je Cho, Cheonan-si (KR); Yun-Seok Lee, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 699 days.

(21) Appl. No.: 11/515,125

(22) Filed: Sep. 1, 2006

(65) Prior Publication Data

US 2007/0052343 A1 Mar. 8, 2007

(30) Foreign Application Priority Data

Sep. 2, 2005 (KR) ...................... 10-2005-0081651

(51) Int. Cl.
G02F 1/1339 (2006.01)

(52) U.S. Cl. ...................................... 349/155; 349/156

(58) Field of Classification Search ......... 349/155–157, 349/187–192
See application file for complete search history.

(56) References Cited

U.S. PATENT DOCUMENTS

| 5,499,128 | A  | * | 3/1996  | Hasegawa et al. ............ 349/155 |
| 6,097,467 | A  | * | 8/2000  | Fujimaki et al. ............. 349/155 |
| 6,115,098 | A  | * | 9/2000  | Kume et al. ................. 349/156 |
| 6,211,937 | B1 | * | 4/2001  | Miyachi et al. .............. 349/156 |
| 6,275,280 | B1 | * | 8/2001  | Kajita et al. ................. 349/155 |
| 6,339,462 | B1 | * | 1/2002  | Kishimoto et al. ........... 349/156 |
| 6,501,526 | B1 | * | 12/2002 | Oh ............................. 349/155 |
| 6,677,024 | B2 | * | 1/2004  | Jousse et al. .................. 428/80 |
| 6,747,727 | B2 | * | 6/2004  | Liu ............................. 349/187 |

* cited by examiner

*Primary Examiner*—Andrew Schechter
*Assistant Examiner*—Paisley L Arendt
(74) *Attorney, Agent, or Firm*—F. Chau & Associates, LLC

(57) ABSTRACT

A display panel includes a first substrate, a second substrate arranged opposite to the first substrate, and a column spacer formed on at least one of the first substrate or the second substrate to maintain a space between the first and second substrates, wherein the column spacer has a bottom side having a shape of a concave-sided polygon.

18 Claims, 6 Drawing Sheets

ID OF RELATED PATENT
DISPLAY PANEL AND METHOD OF MANUFACTURING THE SAME COMPRISING A COLUMN SPACER HAVING A BOTTOM SIDE HAVING A SHAPE OF A CONCAVE-SIDED POLYGON

CROSS-REFERENCE TO RELATED PATENT APPLICATION

This application claims priority to Korean Patent Application No. 10-2005-0081651, filed on Sep. 02, 2005, the contents of which are herein incorporated by reference in its entirety.

BACKGROUND OF THE INVENTION

1. Technical Field

The present disclosure relates to a display panel and, more particularly, to a display panel improving a pressure resistance and a liquid crystal drip margin by improving a structure of a column spacer maintaining a space between both display panels.

2. Discussion of Related Art

A display panel is used in a display device to display images. There are various kinds of display panels such as a liquid crystal display (LCD), which is a type of flat panel display for displaying images using liquid crystals. In general, LCDs feature low power consumption, slim, lightweight design, with low driving voltage.

A conventional liquid crystal panel includes an upper substrate having common electrodes and color filters, a lower substrate having thin film transistors and pixel electrodes, a liquid crystal layer between the upper and lower substrates, and a spacer for maintaining a space between the opposing substrates. An LCD displays images by applying electric potentials to the pixel electrodes and the common electrodes to generate an electric field in the liquid crystal layer to control the alignment of the liquid crystal molecules and the quantity of light transmitted.

To improve the display quality of an LCD device, the uniformity of the thickness of the liquid crystal layer (also referred to as the "cell gap" or "cell thickness") can be controlled. The cell gap is controlled by spacers disposed on the upper and lower substrates. The common types of spacers include spherical silica bead spacers that are randomly arranged, and column spacers or rigid spacers formed in a regular pattern.

The column spacers may be formed in a desired pattern corresponding to an area outside the emissive region of pixels, for example, at a channel portion, a gate line, or a storage electrode line, using standard photolithography techniques.

A conventional column spacer may be formed approximating a shape of a cylinder, a truncated circular cone, or a hemisphere. A cross-section of the conventional column spacer parallel to the surface of the display panel may approximate a shape of a circle, an ellipse, a quadrangle, or a rhombus.

However, external pressure may be applied to the display panel during the manufacturing process thereof or during use. When the conventional column spacers are used to maintain a space between the opposing substrates, the column spacers may become deformed or collapse because of external pressure, or a lower layer of the column may collapse. This may cause cell gap non-uniformity in the display panel. The thickness and uniformity of the cell gap affects display performance. If the cell gap non-uniformity occurs, color irregularity may occur.

The liquid crystal material may be drip-fed on the surface of one substrate, on which a closed pattern is formed with a sealing material, so that a filler hole for injection need not be provided, but if the number of the column spacers is increased to improve the pressure resistance characteristic, a liquid crystal drip margin is deteriorated.

SUMMARY OF THE INVENTION

An exemplary embodiment of the present invention provides a display panel including a first substrate, a second substrate arranged opposite to the first substrate, and a column spacer formed on at least one of the first substrate or the second substrate to maintain a space between the first and second substrates, wherein the column spacer has a bottom side having a shape of a concave-sided polygon.

A corner of the concave-sided polygon may be rounded.

The concave-sided polygon may be a concave-sided polygon having at least four corners.

The shape of a traverse section of the column spacer may be a concave-sided polygon including a plurality of corners and a plurality of concave sides connecting the corners.

The column spacer may be formed by exposure using a projection type of light exposer and a mask.

The exposure may be performed in a state in which the mask is disposed away from the focal point of the light exposer.

An average inclination angle of the column spacer relative to a surface of the first substrate or the second substrate may be about 60 degrees to about 90 degrees.

The column spacer may be formed by exposure using a proximity type of light exposer and a mask.

The mask may have a pattern of a polygon having at least four corners.

An average inclination angle of the column spacer relative to a surface of the first substrate or the second substrate may be about 10 degrees to about 50 degrees.

An exemplary embodiment of the present invention provides a method of manufacturing a display panel including forming a first substrate including thin film transistors and pixel electrodes, forming a second substrate including light blocking members and color filters, and forming a column spacer on at least one of the first substrate or the second substrate, the column spacer maintaining a space between the first and second substrates, the column spacer having a bottom side having a shape of a concave-sided polygon.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
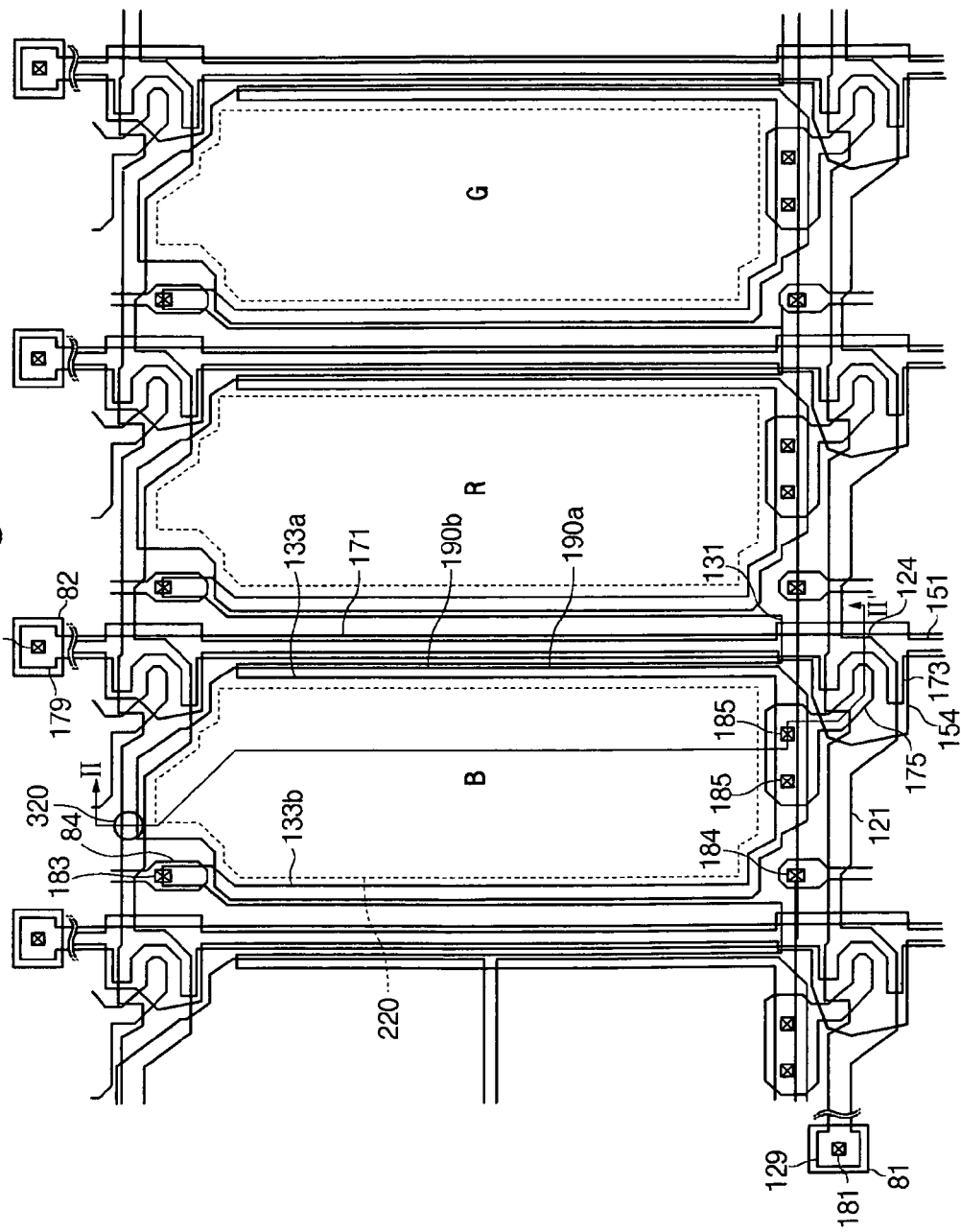
FIG. 1 is a layout view of a first substrate of a display panel according to an exemplary embodiment of the present invention.

Hereinafter, exemplary embodiments of the present invention will be described with reference to the accompanying drawings. In the drawings, the size and relative sizes of layers, films, panels, and regions may be exaggerated for clarity. Like reference numerals refer to similar or identical elements throughout the description of the figures. FIG. 1 is a layout view of a first substrate of a display panel according to an exemplary embodiment of the present invention.

Figure 2:
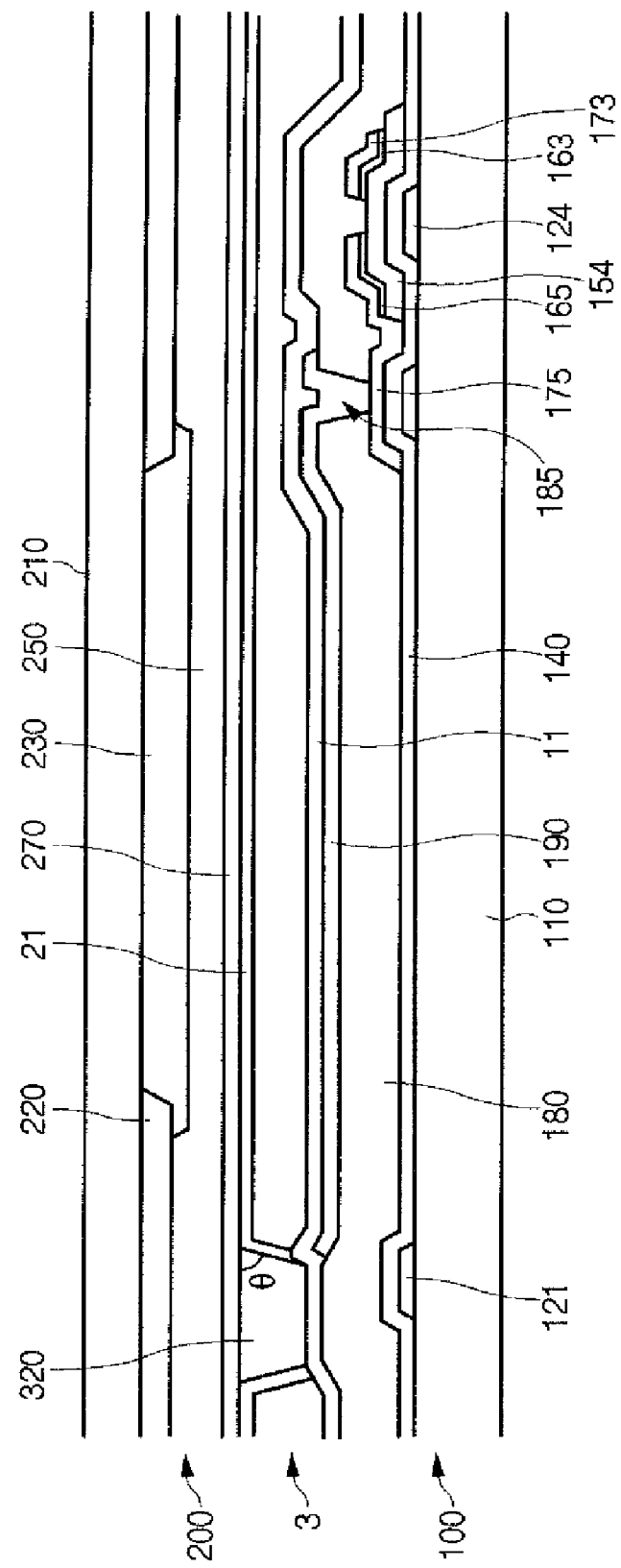
FIG. 2 is a cross-sectional view of a display panel including the first substrate of FIG. 1 taken along a line II-II'.

FIG. 2 is a cross-sectional view of a display panel including the first substrate of FIG. 1 taken along a line II-II'.

A column spacer formed on a second substrate opposite to the first substrate is shown in FIG. 1.

Referring to FIG. 1, the display panel includes a first substrate 100 and a second substrate 200 arranged opposite to each other, a liquid crystal layer 3 including liquid crystal molecules disposed between the first and second substrates 100 and 200, and a column spacer 320 for maintaining a space between the opposing substrates 100 and 200. Alignment layers 11 and 21 are formed in each of the substrates 100 and 200. The alignment layers 11 and 21 can arrange the liquid crystal molecules of the liquid crystal layer 3 in a twisted nematic orientation, in which the liquid crystal molecules are aligned to be sequentially twisted from the first substrate 100 to the second substrate 200, or perpendicularly to the first and second substrates 100 and 200.

A plurality of gate lines 121 generally extending in a horizontal direction are formed on a first insulation substrate 110 that comprises an insulating material such as glass, quartz, ceramic, plastic, or the like. A plurality of portions of the gate line 121 form a plurality of gate electrodes 124, and one end portion 129 thereof is configured for connection with an external circuit.

Storage electrode wiring is formed on the first insulation substrate 110 at the same layer as the gate line 121. The storage electrode wiring includes a storage electrode line 131 extending parallel with the gate line 121 at an edge of pixel area, and sets of storage electrodes 133a and 133b extending from the storage electrode line 131. For example, one set of the storage electrodes 133a and 133b extends in a vertical direction and is disposed in the edge of the pixel. It is to be understood that the storage electrode wiring may include various configurations of the storage electrodes 133a and 133b.

The gate line 121 and the storage electrode wiring 131, 133a, and 133b may comprise a metal, such as for example, Al, Ag, Cr, Ti, Ta, Mo, alloys thereof, or the like. Although the gate line 121 and the storage electrode line 131 are formed in a single layer in an exemplary embodiment of the present invention as shown in FIG. 2, the gate line 121 and the storage electrode line 131 can be formed in multi-layers including a metal layer of Cr, Mo, Ti, Ta, or alloys thereof and a metal layer of an Al group or a Ag group having low resistivity. The gate line 121 and the storage electrode wiring 131, 133a, and 133b can comprise various metals or conductive materials, and can be formed in a single layer or multi-layers, for example, patterned under the same etch conditions. Side surfaces of the gate line 121 and the storage electrode line 131 are inclined. In an exemplary embodiment of the present invention, the side surfaces of the gate line 121 and the storage electrode line 131 are inclined at about 30 degrees to about 80 degrees relative to a horizontal surface.

A gate insulating layer 140, which is made of silicon nitride (SiNx), etc., is formed on both the gate line 121 and the storage electrode wiring 131, 133a, and 133b.

A plurality of data lines 171 and a plurality of drain electrodes 175 are formed on the gate insulating layer 140. Each of the data lines 171 extends along a substantially vertical direction, and extends a plurality of branches toward each of the drain electrodes 175 so as to form a source electrode 173. The gate electrode 124, the source electrode 173, and the drain electrode 175 are three electrodes of a thin film transistor.

An end portion 129 of the data line 171 having a larger width than data line 171 is configured for connection with an external circuit.

The data line 171, the source electrode 173, and the drain electrode 175 comprise a conductive material, such as for example, chromium, molybdenum, aluminum, or an alloy thereof, and can be formed in a single layer or multi-layers.

Under the data line 171 and the drain electrode 175, a plurality of semiconductor stripes 151 extending in the vertical direction along the data line 171 are formed. The semiconductor stripe 151 comprises amorphous silicon or the like and extends toward the gate electrode 124, the source electrode 173, and the drain electrode 175 so as to have a channel portion 154.

A plurality of ohmic contact stripes (not shown) and ohmic contact islands 165 are formed between the semiconductor 151 and the data line 171 and between the source electrode 173 and the drain electrode 175 to decrease contact resistance between the two members. The ohmic contact 161 may comprise amorphous silicon doped with silicide or an n-type impurity in a high concentration and includes a branched ohmic contact 163. The ohmic contact island 165 is disposed opposite to the ohmic contact 163 with respect to the gate electrode 124.

On the data line 171, the source electrode 173, and the drain electrode 175, a passivation layer 180 that comprises an organic material, for example, having an excellent planarization characteristic and photosensitivity, a low dielectric constant insulating material, such as for example, a-Si:C:O, a-Si:O:F which may be formed by plasma enhanced chemical vapor deposition (PECVD), or an inorganic insulating material such as silicon nitride, is formed.

A plurality of contact holes 182 and 185, which expose the end portion 179 of the data line 171 and at least a portion of the drain electrode 175, are formed in the passivation layer 180. An end portion 129 of the gate line 121 has a contact portion connected to an external driving circuit. A plurality of contact holes 181 penetrate the gate insulating layer 140 and the passivation layer 180 so as to expose the end portion 129 of the gate line 121. A plurality of contact holes 183 and 184 exposing a portion of the storage electrode line 131 penetrate the gate insulating layer 140 and the passivation layer 180.

On the passivation layer 180, a plurality of pixel electrodes 190 and a plurality of contact assistants 81 and 82 are formed. The pixel electrodes 190 and the contact assistants 81 and 82 may comprise a transparent conductive material such as indium tin oxide (ITO) or indium zinc oxide (IZO), or an opaque conductive material, for example, having an excellent light reflection characteristic such as aluminum (Al).

A storage wiring connecting bridge 84, which connects two storage electrode lines 131 disposed at both sides of the gate line 121, is formed at the same layer as the pixel electrode 190 on the passivation layer 180.

The contact assistants 81 and 82 are electrically connected to the end portion 129 of the gate line and the end portion 179 of the data line through the contact holes 181 and 182, respectively.

Hereinafter, the second display panel 200 will be described.

The second insulation substrate 210 comprises an insulating material such glass, quartz, ceramic, or plastic. On the second insulation substrate 210, a light blocking member 220 having an opening facing the pixel electrode 190 of the first display panel 100 and preventing light leakage between neighboring pixels is formed. The light blocking member 220 is formed at a position corresponding to the thin film transistor so as to block an inflow of external light to a channel portion 154 of the thin film transistor. The dotted line in FIG. 1 designates the opening of the light blocking member. The light blocking member ban comprise a single metal layer of chromium, chromium oxide, or chromium nitride, metal multi-layers formed by combining the single metal layers, or a photosensitive organic material including a black pigment in order to block light. Carbon black, titanium oxide, etc., can be used as the black pigment.

Color filters 230 of three primary colors are sequentially disposed on the second insulation substrate 210 on which the light blocking member 220 is formed. It is to be understood that the colors of the color filters 230 are not limited to the three primary colors, but may be variously determined at least one color. Although a boundary of each of the color filters 230 is located on the light blocking member 220 in FIG. 1, various arrangements of the color filters 230 are suitable for implementing the present invention. For example, the edges of the neighboring color filters 230 may be overlapped with each other so as to serve the same role of blocking the light leakage as the light blocking member 220.

On the light blocking member and the color filter, a planarization layer 250 comprising an insulating material is formed. The planarization layer 250 protects the color filter 230, and the overall planarization of the second display panel 200 is realized by the planarization layer 250. The planarization layer 250 may comprise an acryl-based epoxy material.

On the planarization layer 250, a common electrode 270, which generates an electric field for activating liquid crystal molecules together with the pixel electrode 190 and is made of a transparent conductive material such as ITO or IZO, is formed.

A column spacer 320, which maintains the space between the first and second substrates 100 and 200 and comprises an insulating material, is formed between the first substrate 100 and the second display panel 200 so as to support the first and second substrates 100 and 200.

Although the column spacer 320 is shown formed on the second substrate 200 in FIG. 2, various configurations are suitable for implementing the embodiments of the present invention. For example, the column spacer 320 may be formed on one of the first substrate 100 and the second substrate 200, or on both the substrates 100 and 200. The column spacer 320 is disposed corresponding to the thin film transistor, the gate line 121, the data line 171, or a crossing region of the gate line 121 and the data line 171.

According to an exemplary embodiment of the present invention the column spacer 320 comprises a photosensitive material, and has an average inclination angle $\theta$ of about 60 degrees to about 90 degrees relative to a surface of the second display panel 200. As such, as the inclination angle $\theta$ comes close to vertical, and pressure acting on the column spacer 320 is substantially dispersed and focused on an outer portion of the column spacer 320. The greater the circumference of the column spacer 320, the more effectively the pressure focused on the outer portion of the column spacer 320 can be dispersed.

Figure 3:
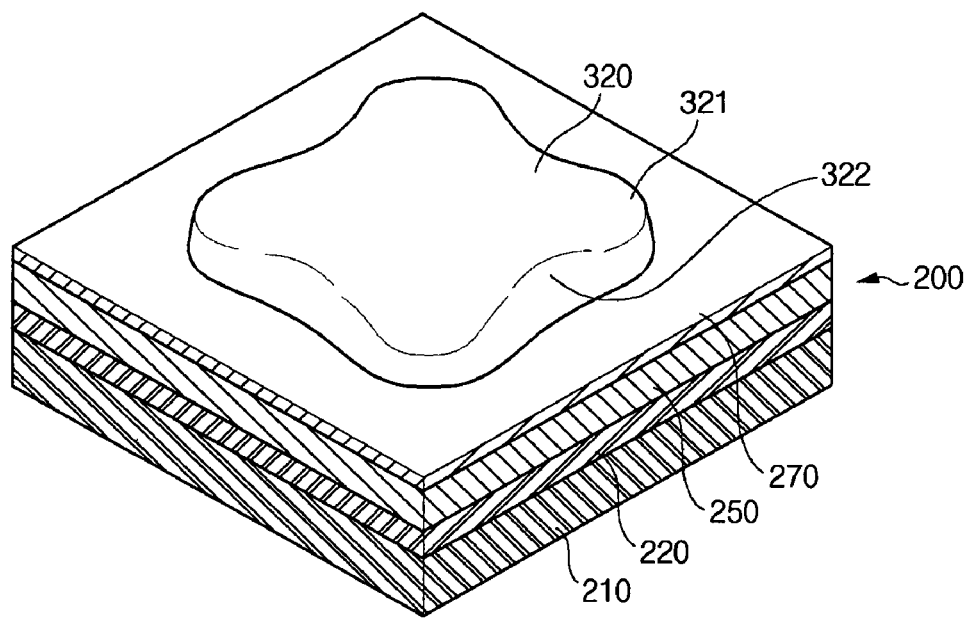
FIG. 3 is a perspective view of a column spacer of FIG. 2, according to an exemplary embodiment of the present invention.

FIG. 3 is a perspective view of a column spacer of FIG. 2, according to an exemplary embodiment of the present invention. Referring to FIG. 3, the column spacer 320 will be described.

As shown in FIG. 3, a bottom side and a traverse section (i e., a section taken along line parallel to the bottom side) of the column spacer 320 have a shape of a concave-sided polygon. As used herein, "a concave-sided polygon" means a polygon with sides that are indented into a center thereof. A region (hereinafter referred to as a corner) near the apex of the concave-sided polygon may be rounded. According to an exemplary embodiment of the present invention, the traverse section of the column spacer 320 has a shape of a concave-sided polygon including a plurality of corners 321 and a plurality of concave sides 322 connecting the corners 321. Such a concave-sided polygon has a greater ratio of circumference to area than a general polygon with a straight-line side. According to an exemplary embodiment of the present invention, by increasing the circumference of the column spacer 320, the column spacer 320 can absorb external pressure so that the pressure resistance characteristic may be substantially enhanced. In accordance with an exemplary embodiment of the present invention, the traverse section of the column spacer 320 is formed as a concave-sided polygon having an enlarged circumference with respect to area, and pressure focused on an outer portion of the column spacer 320 can be effectively dispersed.

In the display panel according to an exemplary embodiment of the present invention, the traverse section of the column spacer 320 has four corners 321 that may be rounded. It is to be understood that the traverse section of the column spacer 320 can have three, five, or more than five corners 321.

Hereinafter, a method of manufacturing the display panel according to an exemplary embodiment of the present invention will be explained with emphasis on the process of forming the column spacer 320.

First, a photosensitive material that includes a photoreaction initiator and solvents together in a resin is coated on the second display panel 200 on which the light blocking member 220, the color filter 230, the planarization layer 250, the common electrode 270, and so on have been formed.

Subsequently, an exposure process is performed, for example, using a projection type of light exposer and a mask. The projection type of light exposer projects light in a state of being spaced apart from the mask. The projection type of light exposer has strong linearity of light, so if exposure is performed using the projection type light exposer, a column spacer 320 with a relatively steep inclination angle is formed. For example, a CANON® light exposer can be used as the projection type of light exposer. The exposure type can be classified according to the manner of projecting light. For example, the exposure type may be a stepper type that projects light by stages or a scanning type that projects light by scanning. In an exemplary embodiment of the present invention, the scanning type is used.

Figure 4:
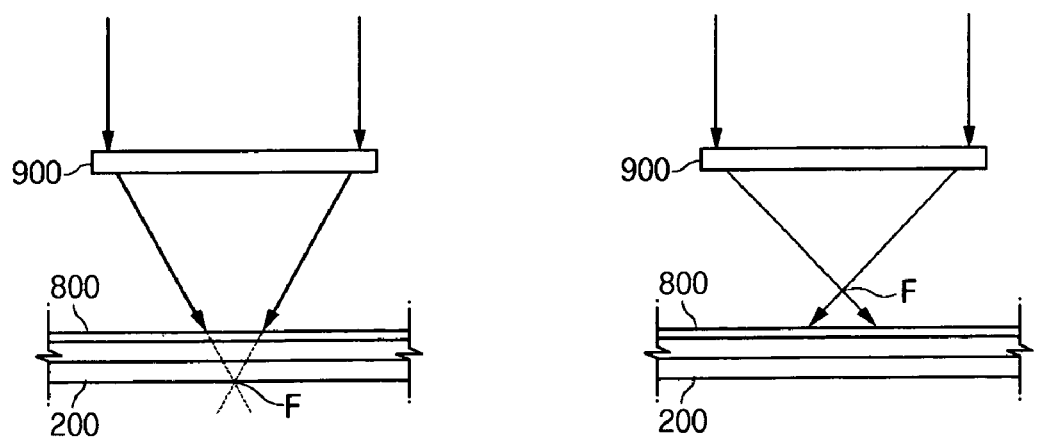
FIG. 4 is a drawing showing an exposure method for forming the column spacer of FIG. 3, according to an exemplary embodiment of the present invention.

FIG. 4 is a drawing showing an exposure method for forming the column spacer of FIG. 3, according to an exemplary embodiment of the present invention.

As shown in FIG. 4, a mask 800 is disposed away from the focal point F of a light exposer 900, and an exposure process is performed. As shown in FIG. 4, the mask 800 can be disposed closer than the focal point F of the light exposer 900 or farther than the focal point F of the light exposer 900. For example, the mask 800 and the light exposer 900 may be arranged such that the focal point F of the light exposer 900 is formed below or above the mask 800. The column spacer 320 having the traverse section of the concave-sided polygon as shown in FIG. 3 may be formed during the following development process. In this example, the mask 800 has a circular pattern. If the mask 800 is disposed to be away from the focal point of the light exposer 900, light passing the circular pattern of the mask 800 is severely refracted. In an exemplary embodiment of the present invention, the column spacer 320 is formed with a shape of the concave-sided polygon.

Subsequently, the first substrate 100 and the second substrate 200 are arranged opposite to each other such that the column spacer 320 formed in the second substrate 200 corresponds to the thin film transistor, the gate line 121, the data line 171, or the crossing region of the gate line 121 and the data line 171. Then, using a sealant (not shown), the first and second substrates 100 and 200 are attached to each other.

Subsequently, a space between the first and second substrates 100 and 200 is filled with the liquid crystal layer 3, for example, using a liquid crystal drip method or a vacuum injection method.

Figure 5:
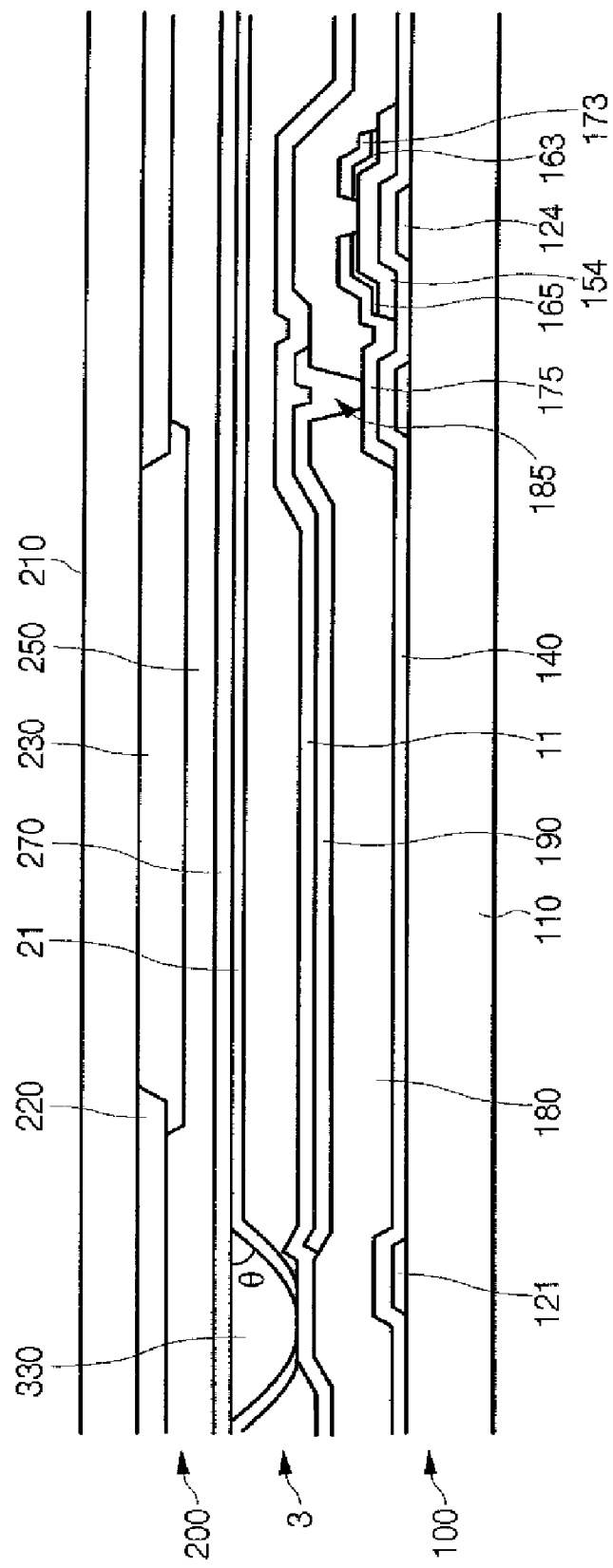
FIG. 5 is a cross-sectional view of a display panel according to an exemplary embodiment of the present invention.

FIG. 5 shows a cross-sectional view of a display panel according to an exemplary embodiment of the present invention.

As shown in FIG. 5, a column spacer 330 formed on the second display panel 200 and maintaining a space between both display panels 100 and 200 is formed to have a relatively gentle average inclination angle θ of about 10 degrees to about 50 degrees relative to a surface of the second display panel 200. The gentler the inclination angle θ is, the better the elasticity of the column spacer 330 becomes. Accordingly, compression and recovery characteristics of the column spacer 330 with respect to external pressure are substantially improved.

Figure 6:
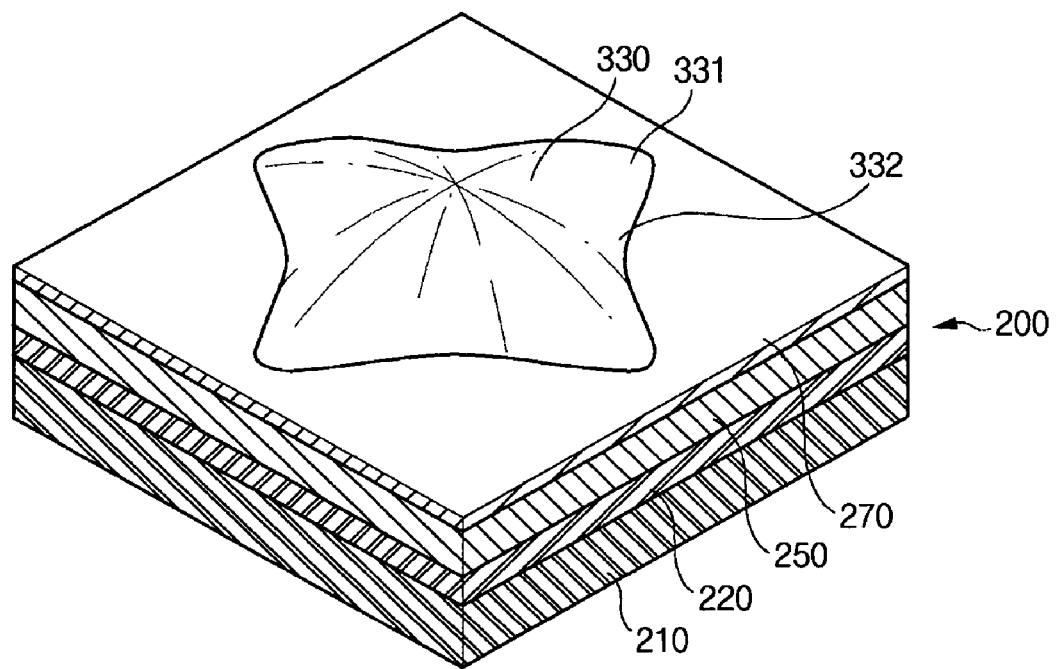
FIG. 6 is a perspective view of a column spacer of FIG. 5, according to an exemplary embodiment of the present invention.

FIG. 6 is a perspective view of a column spacer of FIG. 5, according to an exemplary embodiment of the present invention. Referring to FIG. 6, the column spacer 330 will be described.

As shown in FIG. 6, a shape of the bottom side of the column spacer 330 is the concave-sided polygon having four corners 331, and the column spacer 330 is formed to have a gentle inclination angle relative to the surface of the second display panel 200. In an exemplary embodiment of the present invention, the area of the top portion of the column spacer 330, that is, the area of the column spacer 330 contacting the first display panel 100, is small. The corner of the concave-sided polygon may be rounded. In an exemplary embodiment of the present invention, the traverse section of the column spacer 330 has a concave-sided polygon shape including a plurality of corners 331, and a plurality of concave sides 332 connecting the corners 331. The concave-sided polygon has a greater ratio of circumference to area than a general polygon with a straight-line side.

In an exemplary embodiment of the present invention, the column spacer 330 has a gentle inclination angle, elasticity of the column spacer 330 is improved, and the circumference of the bottom side is increased so that pressure can be effectively dispersed. Accordingly, the pressure resistance of the column spacer 330 is further improved, so that the column spacer 330 can stably maintain the space between the first and second substrates 100 and 200 against external pressure.

Hereinafter, a manufacturing process of the display panel according to an exemplary embodiment of the present invention will be explained with emphasis on the process of forming the column spacer 330.

First, a photosensitive material that includes a photoreaction initiator and solvents together in a resin is coated on the second substrate 200 in which the light blocking member 220, the color filter 230, the planarization layer 250, the common electrode 270, and so on have been formed.

Subsequently, an exposure process is performed, for example, using a proximity type of light exposer and a mask. The proximity type of light exposer projects light in a state of being adjacent to the mask. A column spacer 330 having a relatively gentle inclination angle is formed.

Figure 7A:
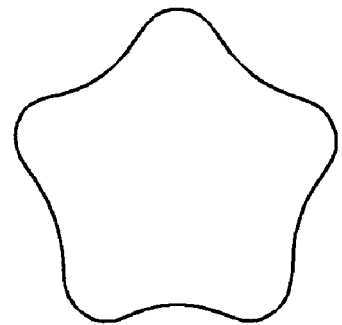
FIG. 7A to FIG. 7C are top plan views of variations of the column spacer of FIG. 6, according to exemplary embodiments of the present invention.
Figure 7B:
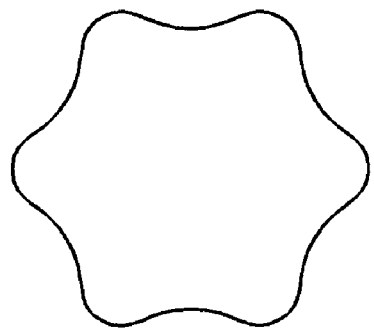
Figure 7C:
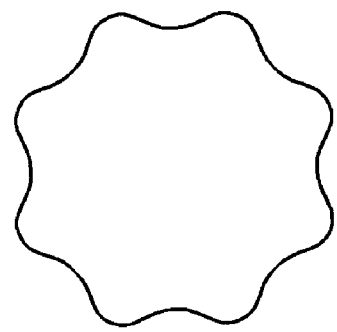

FIG. 6 is a perspective view of a column spacer of FIG. 5, according to an exemplary embodiment of the present invention. In accordance with an exemplary embodiment of the present invention, the mask has a pattern of a concave-sided polygon. FIG. 6 shows a shape of the column spacer 330 formed by the mask having a pattern of the concave-sided polygon having four corners 331. However, the column spacer 330 can be embodied using the mask having a pattern of any concave-sided polygon with three, five, or more than five corners 331. FIG. 7A to FIG. 7C exemplarily show the shape of the traverse section of the column spacer 330 formed using the masks having patterns of polygons having five and more than five corners 331.

As described above, according to exemplary embodiments of the present invention, the structure of the column spacer for maintaining a space, between the display panels is improved, and the pressure resistance characteristic and the liquid crystal drip margin of the display panel can be improved.

In an exemplary embodiment of the present invention, the column spacer is formed such that the circumference is relatively large with respect to area, and pressure focused on an outer portion of the column spacer can be effectively dispersed, and the pressure resistance of the column spacer may be improved, and the liquid crystal drip margin may be improved.

In an exemplary embodiment of the present invention, the elasticity of the column spacer is improved, and the pressure resistance may be improved.

Although the exemplary embodiments of the present invention have been described in detail with reference to the accompanying drawings, it is to be understood that the inventive processes and apparatus should not be construed as limited thereby. It will be readily apparent to those of reasonable skill in the art that various modifications to the foregoing exemplary embodiments can be made without departing from the scope of the invention as defined by the appended claims, with equivalents of the claims to be included therein.

What is claimed is:

1. A display panel comprising:
  a first substrate;
  a second substrate arranged opposite to the first substrate; and
  a column spacer formed on at least one of the first substrate and the second substrate to maintain a space between the first and second substrates,
  wherein the column spacer has a bottom side having a shape of a concave-sided polygon comprising at least two smooth concave sides connected with each other by a rounded corner between the at least two concave sides.

2. The display panel of claim 1, wherein the concave-sided polygon has at least four corners.

3. The display panel of claim 1, wherein a shape of a traverse section of the column spacer is a concave-sided polygon including a plurality of corners and a plurality of concave sides connecting the corners.

4. The display panel of claim 1, wherein the column spacer is formed by exposure using a projection type of light exposer and a mask.

5. The display panel of claim 4, wherein the exposure is performed in a state in which the mask is disposed away from a focal point of the light exposer.

6. The display panel of claim 4, wherein an average inclination angle of the column spacer relative to a surface of the first substrate or the second substrate is about 60 degrees to about 90 degrees.

7. The display panel of claim 1, wherein the column spacer is formed by exposure using a proximity type of light exposer and a mask.

8. The display panel of claim 7, wherein the mask has a pattern of a polygon having at least four corners.

9. The display panel of claim 7, wherein an average inclination angle of the column spacer relative to a surface of the first substrate or the second substrate is about 10 degrees to about 50 degrees.

10. A method of manufacturing a display panel, comprising:
    forming a first substrate including thin film transistors and pixel electrodes;
    forming a second substrate including light blocking members and color filters; and
    forming a column spacer on at least one of the first substrate or the second substrate, the column spacer maintaining a space between the first and second substrates, the column spacer having a bottom side having a shape of a concave-sided polygon comprising at least two smooth concave sides connected with each other by a rounded corner between the at least two concave sides.

11. The method of claim 10, wherein the concave-sided polygon is a concave-sided polygon having at least four corners.

12. The method of claim 10, wherein a shape of a traverse section of the column spacer is a concave-sided polygon including a plurality of corners and a plurality of concave sides connecting the corners.

13. The method of claim 10, wherein the column spacer is formed by exposure using a projection type of light exposer and a mask.

14. The method of claim 13, wherein the exposure is performed in a state in which the mask is disposed away from the focal point of the light exposer.

15. The method of claim 13, wherein an average inclination angle of the column spacer relative to a surface of the first substrate or the second substrate is about 60 degrees to about 90 degrees.

16. The method of claim 10, wherein the column spacer is formed by exposure using a proximity type of light exposer and a mask.

17. The method of claim 16, wherein the mask has a pattern of a polygon having at least four corners.

18. The method of claim 16, wherein an average inclination angle of the column spacer relative to a surface of the first substrate or the second substrate is about 10 degrees to about 50 degrees.

* * * * *